United States Patent Office 3,118,932
Patented Jan. 21, 1964

3,118,932
DIARYLPHOSPHINO-HALO-DECABORANE COMPOUNDS AND PRODUCTION THEREOF
Earl L. Muetterties, West Chester, Pa., assignor to E. I. du Pont de Nemours and Company, Wilmington, Del., a corporation of Delaware
No Drawing. Filed July 2, 1962, Ser. No. 207,041
13 Claims. (Cl. 260—500)

This invention relates to a new class of boron hydride compounds and to a method for preparing them.

The products of this invention are compounds of the formula $M(B_{10}H_{12-y}X_yPRR')_m$, where M is a cation of valence $m$, defined in more detail below; X is chlorine, bromine, or iodine; $y$ is 1, 2, or 3; and R and R' are the same or different and are aryl or alkaryl groups of 6–14 carbons. The above formula can also be written $$M^{m+}(B_{10}H_{12-y}X_yPRR'^-)_m$$

in which the designation of the charge associated with each ion is in accord with the acid or salt-like character of the products. The invention includes hydrates of the products, i.e., compounds of the formula $$M(B_{10}H_{12-y}X_yPRR')_m \cdot nH_2O$$

wherein M, X, $y$ and $m$ are as previously defined and $n$ is a cardinal whole number which varies with the conditions and extent of drying the compound. "$n$" has no definite limit, for when it is large, the composition approaches a concentrated aqueous solution.

The anion $(B_{10}H_{12-y}X_yPRR')^-$ is a novel and characteristic feature of each product. Examples of R and R' are phenyl, tolyl, xylyl, trimethylphenyl, ethylphenyl, di(tert-butyl)phenyl, tert-pentylphenyl, octylphenyl, naphthyl, and methylnaphthyl. A preferred class, because of ease of preparation of intermediates, is that in which R and R' are the same.

M can be hydrogen ion (usually present in the hydrated form, i.e., hydronium, $H_3O^+$) or a cation of any metal of groups IA and IIA of the periodic table shown in Deming's "General Chemistry," 5th ed., page 156 (Wiley, 1944), i.e., the alkali metals and the alkaline-earth metals. In addition it can be ammonium, hydrazonium, or any of an extremely broad class of substituted ammonium, hydrazonium, phosphonium, and sulfonium cations represented by the formulas

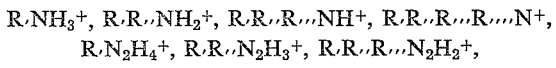

where

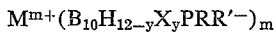

are the same or different and are monovalent hydrocarbyl groups of at most 12 carbons in which any unsaturation is aromatic, and divalent hydrocarbyl and oxygen-interrupted hydrocarbyl groups of at most 12 carbons in which any unsaturation is aromatic, said divalent groups being formed by joining together any two of the groups R', R'', R''' and R''''. Examples are methylammonium, cyclopropylammonium, 1-methylheptylammonium, 2-(1-naphthyl)ethylammonium, diisobutylammonium, dicyclohexylammonium, dinonylammonium, morpholinium, dodecamethyleniminium, triisopropylammonium, N-methylpiperidinium, pyridinium, 4-methylquinolinium, trihexylammonium, benzyltrimethylammonium, tetraisopentylammonium, dodecyltrimethylammonium, phenylhydrazonium, 1-methyl-1-phenylhydrazonium, 1-methyl-2-isopropylhydrazonium, dodecylhydrazonium, 1,1,2-triethylhydrazonium, 1,1,1-triheptylhydrazonium, tetramethylhydrazonium, tetrabenzylhydrazonium, tetramethylphosphonium, tetrabenzylphosphonium, tetra(1-naphthyl)phosphonium, ethyltri(decyl)phosphonium, benzyldodecyldimethylphosphonium, dihexylmethylphenylphosphonium, 2,4,6-trimethylphenyltrimethylphosphonium, isobutylethylmethylisopropylphosphonium, ethylpentamethylene-p-tolylphosphonium, triphenylsulfonium, methyltetramethylenesulfonium, benzyldodecylmethylsulfonium, and methyldipentylsulfonium. M can also be a polybasic substituted ammonium, phosphonium, or sulfonium cation of the type described above, i.e., one in which two or more nitrogen, phosphorus, or sulfur atoms are joined by one or more divalent organic groups. Again for reasons of availability, preferred cations of this type are those in which any organic group is hydrocarbyl of at most 12 carbons and in which any unsaturation is aromatic. Examples are ethylenediammonium, hexamethylenebis(dimethylammonium), piperazinium, tetramethylenebis(triethylphosphonium), p-phenylenediammonium, ethylenebis(dodecylmethylsulfonium), and diethylenetriammonium. Lower alkyl groups are specially preferred as organic substituents. A preferred class of products, because they offer a wide range of solubilities, are those in which M is alkali metal, hydronium, tetra(lower alkyl)ammonium, or tri(lower alkyl)sulfonium.

PREPARATION OF THE PRODUCTS

(a) Preparation of Intermediates

The starting material for the preparation of any of the products of this invention is a compound of the formula $$M(B_{10}H_{12}PRR')_m$$

where M, $m$, R, and R' are as defined above. The preparation of $CsB_{10}H_{12}P(C_6H_5)_2$, which follows, exemplifies the method of making these compounds:

A reactor containing 3.66 g. (0.03 mole) of decaborane ($B_{10}H_{14}$) is evacuated and cooled in liquid nitrogen. Ethyl ether (100 ml.) is added. To this mixture is added, with stirring and cooling (liquid nitrogen), 12 ml. of a 2.0 molar solution of methylmagnesium iodide in ethyl ether (0.024 mole of $CH_3MgI$). The reaction mixture is allowed to warm to room temperature with stirring, during which time methane is evolved and a solution of decarborylmagnesium iodide, $B_{10}H_{13}MgI$, is formed. To this solution is added 4.9 g. (0.022 mole) of diphenylphosphinous chloride, $(C_6H_5)_2PCl$, and the mixture is warmed at 35° C. for three hours. It is then cooled, and twice its volume of ice-cold, saturated aqueous ammonium chloride is added. The ether layer is decanted, and to it is added an equal volume of toluene. Addition of heptane to the resulting solution precipitates a solid, which is separated, washed with toluene, and dissolved in warm water. The aqueous solution is mixed with saturated aqueous cesium fluoride, whereupon $CsB_{10}H_{12}P(C_6H_5)_2$ precipitates as a crystalline solid. It is separated and recrystallized from water.

*Analysis.*—Calcd. for $C_{12}H_{22}B_{10}CsP$: C, 32.8; H, 5.52; B, 24.7; Cs, 30.4; P, 7.07. Found: C, 33.5; H, 5.69; B, 24.0; Cs, 31.5; P, 7.24.

By substituting an aqueous solution of tetramethylammonium chloride for the aqueous cesium fluoride solution in the above procedure, one obtains the corresponding tetramethylammonium salt, $(CH_3)_4NB_{10}H_{12}P(C_6H_5)_2$. The product is recrystallized from aqueous acetonitrile.

*Analysis.*—Calcd. for $C_{16}H_{34}B_{10}NP$: C, 50.7; H, 9.61; B, 28.5; N, 3.70; P, 18.18. Found: C, 49.6; H, 9.49; B, 28.0; N, 3.70; P, 18.24.

By substituting aqueous trimethylsulfonium iodide for the cesium fluoride solution, one obtains the corresponding trimethylsulfonium salt, $(CH_3)_3SB_{10}H_{12}P(C_6H_5)_2$. This product is recrystallized from aqueous acetonitrile.

*Analysis.*—Calcd. for $C_{15}H_{31}B_{10}PS$: C, 47.0; H, 8.71; B, 28.3; P, 8.10; S, 8.30. Found: C, 47.2; H, 8.57; B, 27.6; P, 8.18; S, 8.50.

The acid hydrate $H_3O^+[B_{10}H_{12}P(C_6H_5)_2]^- \cdot H_2O$ is readily obtained by passing an aqueous solution of any of its soluble salts, e.g., the ammonium salt, through a column packed with an acid ion-exchange resin and concentrating the effluent solution.

*Analysis.*—Calcd. for $C_{12}H_{27}B_{10}O_2P$: C, 42.1; H, 8.53; B, 31.6; P, 9.07; N.E., 342. Found: C, 38.2; H, 8.69; B, 32.2; P, 9.52; N.E., 335.

When one mixes a portion of the aqueous solution of this acid as obtained directly from the ion-exchange column with aqueous triethylammonium chloride, the salt $(C_2H_5)_3NHB_{10}H_{12}P(C_6H_5)_2$ separates as a colorless, crystalline solid.

*Analysis.*—Calcd. for $C_{18}H_{38}B_{10}NP$: B, 26.5; N, 3.44; P, 7.22. Found: B, 26.7; N, 3.30; P, 7.66.

As is illustrated by the foregoing preparations, compounds containing a wide variety of cations in combination with the anion $B_{10}H_{12}P(C_6H_5)_2^-$ can easily be made.

(b) Preparation of Products of the Invention

The products of this invention are prepared by reacting a halogenating agent with a compound of the formula $M(B_{10}H_{12}PRR')_m$, where M, m, R, and R' are as previously defined. Preferred starting materials are salts in which M is a metal of groups IA or IIA, because of ease of isolation of the products. The group IA metal salts are especially preferred because of their availability.

The halogenating agents that can be used include the halogens themselves, i.e., chlorine, bromine, and iodine, and N-halo compounds in which the halogen is "positive," e.g., N-chloro-, N-bromo-, and N-iodo-succinimide. The degree of substitution is controlled by the amount of halogenating agent. With the free halogens, approximately the molar ratio of reactants dictated by the stoichiometry of the desired reaction is used. For products in which y is 3, an excess of halogen can be used. The N-halo compounds are less reactive than the free halogens, and accordingly, a 50–100% molar excess of this type of halogenating agent is usually employed.

The process is conducted in an inert, mutual solvent for the reactants. Typical solvents are water, lower alkanols, ethers such as tetrahydrofuran and 1,2-dimethoxyethane, ether-alcohols such as 2-(2-ethoxyethoxy)-ethanol, and mixtures thereof.

The process can be carried out over a range of temperatures. The reaction proceeds at an appreciable rate at as low as —10° C.; on the other hand, temperatures as high as 100° C. can be used. The temperature will depend to some extent on the halogenating agent. With the free halogens, reaction proceeds readily at 5–40° C. With iodine, the least reactive of the halogens, it may be advantageous to use somewhat higher temperatures, especially when more than one atom of iodine is being introduced.

Time will vary with the temperature, the halogen to be introduced, the halogenating agent, and the degree of halogenation desired. For example, chlorinations, brominations, and monoiodinations with the free halogens usually take place rapidly, i.e., within a few minutes, at ordinary temperatures (20–30° C.). Polyiodinations, and halogenations with N-halo compounds, are advantageously run for longer times. Times of longer than 2–3 hours are hardly ever required at an appropriate temperature within the operable range. When bromine or iodine is the halogenating agent, completion of the reaction is easily determined by noting the disappearance of the characteristic color of the halogen.

The halogenated product obtained by the process just described is that in which the cation, M, is the same as that in the starting material. It is conveniently isolated by evaporation of the solvent and can be purified by recrystallization. Alternatively, the product can be precipitated ("salted out"), optionally before or after partial evaporation, by addition of a concentrated solution of another salt of the same cation.

The products thus obtained can be converted into products of the invention containing any other cation by well-known cation-exchange techniques, e.g., by use of cation-exchange resins or simple metathetical reactions in the absence of such resins.

PROPERTIES OF THE PRODUCTS

The products of this invention are well-defined crystalline acids and salts. In accord with their acid or saltlike character, they are soluble to varying degrees in water and polar organic solvents such as methanol, acetonitrile, ethanol, and acetone, and insoluble in other organic solvents such as benzene, heptane, and ethyl ether. The anion $(B_{10}H_{12-y}X_yPRR')^-$ is unaffected by aqueous mineral acids, by hot water or by hot aqueous alkali.

The following examples illustrate the products and process of this invention.

EXAMPLE 1

A solution of 8.8 g. (0.02 mole) of $CsB_{10}H_{12}P(C_6H_5)_2$ in 200 ml. of methanol/water (about 50/50) was mixed with a solution of 5.3 g. (0.04 mole) of N-cholrosuccinimide in 100 ml. of methanol, and the mixture was kept at room temperature for 24 hours. A saturated aqueous solution of cesium fluoride was added, and the mixture was partially evaporated under reduced pressure, whereupon $CsB_{10}H_{11}ClP(C_6H_5)_2$ precipitated as a crystalline solid. The product was separated by filtration and recrystallized twice from water.

*Analysis.*—Calcd. for $C_{12}H_{21}B_{10}ClCsP$: C, 28.3; H, 4.57; B, 21.3; Cl, 6.97; Cs, 26.1; P, 6.09. Found: C, 31.7; H, 5.45; B, 22.0; Cl, 5.14; Cs, 26.8; P, 6.04.

EXAMPLE 2

A solution of 8.8 g. (0.02 mole) of $CsB_{10}H_{12}P(C_6H_5)_2$ and 8.0 g. (0.06 mole) of N-chloro-succinimide in 200 ml. of methanol/water (50/50) was held at room temperature for one-half hour, heated at 80° C. for two hours, and allowed to cool to room temperature. The mixture was filtered to remove traces of insoluble material, combined with saturated aqueous cesium fluoride, and partially evaporated under reduced pressure, whereupon $CsB_{10}H_{10}Cl_2P(C_6H_5)_2$ precipitated as a crystalline solid. The product was separated by filtration and recrystallized from aqueous methanol.

*Analysis.*—Calcd. for $C_{12}H_{20}B_{10}Cl_2CsP$: C, 28.4; H, 3.98; B, 21.4; Cl, 14.0; Cs, 26.3; P, 6.12. Found: C, 28.7; H, 4.42; B, 20.6; Cl, 13.7; Cs, 24.6, P, 6.04.

EXAMPLE 3

To a solution of 4.4 g. (0.01 mole) of $$CsB_{10}H_{12}P(C_6H_5)_2$$

in aqueous methanol was added a solution of 2.54 g. (0.01 mole) of iodine in methanol. The color of the iodine disappeared within a few minutes. The solution was evaporated under reduced pressure until a crystalline precipitate appeared. This product, which was $CsB_{10}H_{11}IP(C_6H_5)_2$, was separated by filtration and recrystallized from aqueous methanol.

*Analysis.*—Calcd. for $C_{12}H_{21}B_{10}CsIP$: C, 25.6; H, 4.12; B, 19.2; Cs, 23.6; I, 22.5; P, 5.50. Found: C, 23.7; H, 4.87; B, 18.2; Cs, 22.3; I, 21.7; P, 5.66.

A solution of the product in methanol/water (60/40) was passed through a column of an acidic cation-exchange resin ("Amberlite" IR-120-H). The effluent was a solution of the free acid, $H_3OB_{10}H_{11}IP(C_6H_5)_2$, which could be isolated by evaporation. A portion of the solution was combined with aqueous tetramethylammonium chloride, whereupon the tetramethylammonium salt, $(CH_3)_4NB_{10}H_{11}IP(C_6H_5)_2$, precipitated as a crystalline solid. It was separated by filtration and recrystallized from aqueous methanol.

*Analysis.*—Calcd. for $C_{16}H_{33}B_{10}INP$: C, 38.1; H, 7.00; B, 21.4; I, 25.2; P, 6.13. Found: C, 37.8; H, 6.81; B, 21.5; I, 24.5; P, 6.35.

Another portion of the solution of the acid was combined with aqueous trimethylsulfonium iodide, whereupon the trimethylsulfonium salt, $(CH_3)_3SB_{10}H_{11}IP(C_6H_5)_2$, precipitated as a crystalline solid. It was separated by filtration and recrystallized from aqueous methanol.

*Analysis.*—Calcd. for $C_{15}H_{30}B_{10}IPS$: C, 35.4; H, 6.35; B, 21.3; I, 25.0; P, 6.10. Found: C, 33.5; H, 5.86; B, 21.1; I, 27.0; P, 6.4.

Alternatively, the tetramethylammonium and trimethylsulfonium salts just described can be prepared by iodination of $(CH_3)_4NB_{10}H_{12}P(C_6H_5)_2$ and $$(CH_3)_3SB_{10}H_{12}P(C_6H_5)_2$$

The solution of the free acid obtained from the ion-exchange column can be neutralized with ammonium hydroxide; amines; hydrazines; quaternary ammonium, quaternary phosphonium, or sulfonium hydroxides; or hydroxides, oxides, or carbonates of group IA or IIA metals, to give the corresponding ammonium, hydrazonium, substituted ammonium, substituted hydrazonium, quaternary phosphonium, sulfonium, or metal salts containing the $[B_{10}H_{11}IP(C_6H_5)_2]^-$ anion. For example, the ammonium, dodecylammonium, diisobutylammonium, trioctylammonium, benzyltrimethylammonium, diethylhydrazonium, tetrapropylphosphonium, benzyl-dimethylsulfonium, lithium, potassium, magnesium, and beryllium salts can be made in this way. They precipitate as they are formed or can be isolated by evaporation. The substituted ammonium, substituted hydrazonium, quaternary phosphonium, and sulfonium cations in the salts thus produced are those defined and exemplified in columns 1 and 2.

Neutralization reactions leading to a variety of salts, exemplified above for the acid $H_3OB_{10}H_{11}IP(C_6H_5)_2$, are a general property of all the acids of this invention.

EXAMPLES 4–7

Table I summarizes the preparation of additional products of this invention, essentially by the procedure of Example 3. All the products were recrystallized from aqueous methanol.

Additional examples of the products of this invention and the reactants from which they can be formed are listed in Table II. In each example, the starting material of column 3 of Table II is prepared by the process of columns 2 and 3 of the printed specification, the phosphinous halide of column 1 (Table II) being used in place of diphenylphosphinous chloride and an aqueous solution of the salt of column 2 (Table II) being used in place of cesium fluoride. Alternatively, the metal salt of column 3 (Table II) can be prepared by neutralizing the corresponding acid, prepared by the method in column 3 (printed specification), with the hydroxide of the metal. Reaction of the compound of column 3 (Table II) with the halogenating agent of column 4 (Table II) by the process described in column 3 (printed specification) gives the product of the invention shown in column 5 (Table II).

TABLE I

| Ex. No. | Moles $CsB_{10}H_{12}P(C_6H_5)_2$ | Moles Halogen | Temp., °C. | Time | Product | Analysis |
|---|---|---|---|---|---|---|
| 4 | 0.01 | 0.02 $I_2$ | 25 / 60 | 24 hrs. / 0.5 hr. | $CsB_{10}H_{10}I_2P(C_6H_5)_2$ | (Calcd.: C, 20.9; H, 3.22; B, 15.7; I, 36.8; P, 4.49. <br> Found: C, 21.6; H, 3.50; B, 14.8; I, 35.8; P, 4.79. |
| 4 | | | | | $H_3OB_{10}H_{10}I_2P(C_6H_5)_2$ | |
| 4 | | | | | $(CH_3)_4NB_{10}H_{10}I_2P(C_6H_5)_2$ | (Calcd.: C, 30.4; H, 5.45; B, 17.1; I, 40.3; P, 4.91. <br> Found: C, 27.7; H, 5.28; B, 16.8; I, 39.5; P, 4.99. |
| 4 | | | | | $(CH_3)_3SB_{10}H_{10}I_2P(C_6H_5)_2$ | (Calcd.: C, 28.4; H, 4.94; B, 17.0; I, 40.1; P, 4.90. <br> Found: C, 28.4; H, 4.73; B, 17.0; I, 39.7; P, 5.10. |
| 5 | 0.005 | 0.005 $Br_2$ | 18 | <5 min. | $CsB_{10}H_{11}BrP(C_6H_5)_2$ | (Calcd.: C, 27.9; H, 4.48; B, 21.0; Br, 15.4; Cs, 25.7; P, 6.00. <br> Found: C, 27.8; H, 4.77; B, 19.3; Br, 13.6; Cs, 24.3; P, 5.85. |
| 5 | | | | | $H_3OB_{10}H_{11}BrP(C_6H_5)_2$ | |
| 5 | | | | | $(CH_3)_4NB_{10}H_{11}BrP(C_6H_5)_2$ | (Calcd.: C, 41.8; H, 7.73; B, 23.6; Br, 17.4; P, 6.75. <br> Found: C, 42.4; H, 7.72; B, 24.7; Br, 13.8; P, 7.10. |
| 5 | | | | | $(CH_3)_3SB_{10}H_{11}BrP(C_6H_5)_2$ | (Calcd.: C, 39.0; H, 7.25; B, 23.5; Br, 17.3; P, 6.72; S, 6.93. <br> Found: C, 39.3; H, 7.09; B, 23.1; Br, 17.0; P, 6.92; S, 7.10. |
| 6 | 0.005 | 0.01 $Br_2$ | 18 | <5 min. | $CsB_{10}H_{10}Br_2P(C_6H_5)_2$ | (Calcd.: C, 24.2; H, 3.72; B, 18.2; Br, 26.8; P, 5.20. <br> Found: C, 24.5; H, 3.98; B, 17.4; Br, 26.8; P, 5.17. |
| 6 | | | | | $H_3OB_{10}H_{10}Br_2P(C_6H_5)_2$ | |
| 6 | | | | | $(CH_3)_4NB_{10}H_{10}Br_2P(C_6H_5)_2$ | (Calcd.: C, 35.7; H, 6.30; Br, 29.9. <br> Found: C, 31.0; H, 6.29; Br, 29.1. |
| 6 | | | | | $(CH_3)_3SB_{10}H_{10}Br_2P(C_6H_5)_2$ | (Calcd.: C, 33.4; H, 5.80; Br, 29.6; S, 5.92. <br> Found: C, 33.5; H, 5.60; Br, 30.2; S, 5.76. |
| 7 | 0.005 | 0.02 $Br_2$ | 18 | <5 min. | $CsB_{10}H_9Br_3P(C_6H_5)_2 \cdot 2H_2O$ | (Calcd.: C, 20.4; H, 2.98; B, 15.3; Br, 33.9; P, 4.52. <br> Found: C, 19.4; H, 2.99; B, 13.3; Br, 33.6; P, 4.21. |

TABLE II

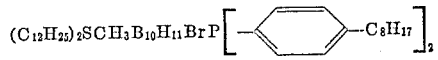

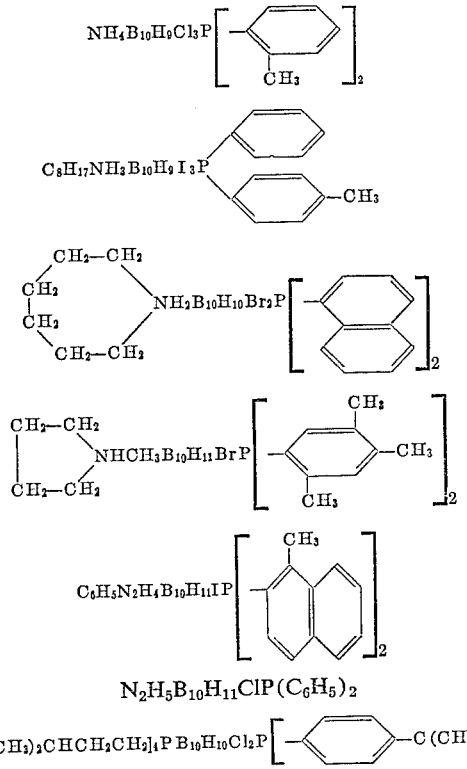

The metal salts of column 5 of Table II can be converted, through exchange reactions carried out by any of several methods hereinbefore discussed, to products of the invention containing the ammonium, hydrazonium or substituted ammonium, hydrazonium, phosphonium, or sulfonium cations defined and exemplified in columns 1 and 2. Examples of products that can thus be made are

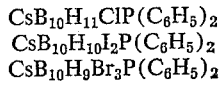

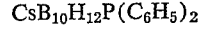

and

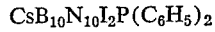

The products of this invention are useful as reducing agents for converting metallic salts to the corresponding metals, which is an essential process in metal plating. In plating with noble metals, the rate of deposition of the metal affects profoundly such properties as the structure of the deposit, the strength of the metallic bond, and the brilliance of the plate. In this connection, the products of the present invention are especially useful in that they give widely varying rates of reduction and kinds of metallic deposits, depending on the halogen present and the degree of substitution. The reduction reaction is also affected by the nature of the groups R and R'. Reduction of the metal can thus be regulated as desired by selection of an appropriate reducing agent from among the products of this invention. The following example is illustrative:

EXAMPLE A

Solutions of
$$CsB_{10}H_{11}ClP(C_6H_5)_2$$
$$CsB_{10}H_{10}I_2P(C_6H_5)_2$$
$$CsB_{10}H_9Br_3P(C_6H_5)_2$$

and
$$CsB_{10}H_{12}P(C_6H_5)_2$$

(control) were made up by dissolving 0.1 g. of each compound in 12 ml. of aqueous 95% methanol. To each solution was added 3 ml. of a saturated aqueous solution of silver nitrate. The solution of $CsB_{10}H_9Br_3P(C_6H_5)_2$ showed the slowest rate of reduction, i.e., appreciably slower than the control. Reduction by $$CsB_{10}N_{10}I_2P(C_6H_5)_2$$

was faster than that by the control, and reduction by $CsB_{10}H_{11}ClP(C_6H_5)_2$ was much faster. The chlorine-substituted salt yielded a fine colloidal deposit of metallic silver, whereas the iodine-substituted salt gave largely an agglomerate of metallic silver.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula $$M(B_{10}H_{12-y}X_yPRR')_m$$

wherein M is a cation having a valence $m$ selected from the class consisting of hydronium, alkali metals, alkaline earth metals, ammonium, hydrazonium, $$R'NH_3^+, R'R''NH_2^+, R'R''R'''NH^+, R'R''R'''R''''N^+$$
$$R'N_2H_4^+, R'R''N_2H_3^+, R'R''R'''N_2H_2^+$$
$$R'R''R'''R''''N_2H^+, R'R''R'''R''''P^+, \text{ and } R'R''R'''S^+$$

wherein R', R'', R''' and R'''' each are hydrocarbyl groups of at most 12 carbon atoms in which any unsaturation is aromatic, and in which any two R', R'', R''' and R'''' groups can be joined to form a divalent group which may be interrupted by an oxygen atom, X is selected from the class consisting of
 chlorine,
 bromine, and
 iodine,
R and R' contain 6 to 14 carbon atoms and are selected from the class consisting of
 aryl, and
 alkaryl,
and $y$ is a cardinal number of from 1 to 3, inclusive.

2. A compound of claim 1 in hydrated form.
3. A compound of claim 1 wherein M is selected from the class consisting of
 alkali metal,
 hydronium,
 tetra(lower alkyl)ammonium, and
 tri(lower alkyl)sulfonium.
4. $CsB_{10}H_{11}ClP(C_6H_5)_2$.
5. Hydrates of $CsB_{10}H_{11}ClP(C_6H_5)_2$.
6. $H_3OB_{10}H_{11}IP(C_6H_5)_2$.
7. Hydrates of $H_3OB_{10}H_{11}IP(C_6H_5)_2$.
8. $CsB_{10}H_{10}I_2P(C_6H_5)_2$.
9. Hydrates of $CsB_{10}H_{10}I_2P(C_6H_5)_2$.
10. $(CH_3)_4NB_{10}H_{11}BrP(C_6H_5)_2$.
11. Hydrates of $(CH_3)_4NB_{10}H_{11}BrP(C_6H_5)_2$.
12. Process for preparing a compound of the formula $$M(B_{10}H_{12-y}X_yPRR')_m$$

wherein M is a cation having a valence $m$ selected from the class consisting of hydronium, alkali metals, alkaline earth metals, ammonium, hydrazonium, $$R'NH_3^+, R'R''NH_2^+, R'R''R'''NH^+, R'R''R'''R''''N^+$$
$$R'N_2H_4^+, R'R''N_2H_3, R'R''R'''N_2H_2^+$$
$$R'R''R'''R''''N_2H^+, R'R''R'''R''''P^+, \text{ and } R'R''R'''S^+$$

wherein R', R'', R''' and R'''' each are hydrocarbyl groups of at most 12 carbon atoms in which any unsaturation is aromatic, and in which any two R', R'', R''' and R'''' groups can be joined to form a divalent group which may be interrupted by an oxygen atom, X is selected from the class consisting of
 chlorine,
 bromine, and
 iodine,
R and R' contain 6 to 14 carbon atoms and are selected from the class consisting of
 aryl, and
 alkaryl,
and $y$ is a cardinal number of from 1 to 3, inclusive, which comprises reacting a compound of the formula $$M(B_{10}H_{12}PRR')_m$$

wherein M, $m$, R and R' are defined as above, with a halogenation reagent selected from the class consisting of
 chlorine,
 bromine,
 iodine,
 N-chlorosuccinimide,
 N-bromosuccinimide, and
 N-iodosuccinimide,
and isolating the resulting $M(B_{10}H_{12-y}X_yPRR')_m$.

13. Process of claim 12 wherein the reaction is carried out at a temperature of from −10° C. to 100° C.

No references cited.